Figure 1:
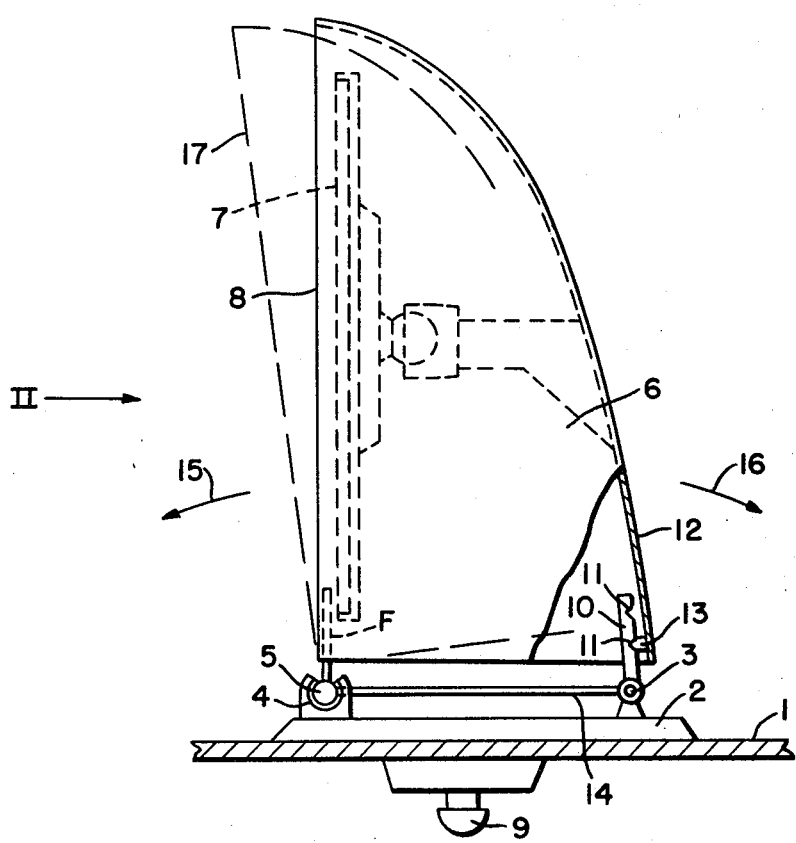

United States Patent [19]

Mittelhäuser

[11] 4,380,370

[45] Apr. 19, 1983

[54] OUTSIDE REAR VIEW MIRROR FOR MOTOR VEHICLES

[76] Inventor: Bernhard Mittelhäuser, No. 57, D-3002 Wedemark 2, Fed. Rep. of Germany

[21] Appl. No.: 261,052

[22] Filed: May 6, 1981

[30] Foreign Application Priority Data

May 6, 1980 [DE] Fed. Rep. of Germany ....... 3017228

[51] Int. Cl.³ .............................................. G02B 7/18
[52] U.S. Cl. ................................ 350/307; 248/475 B; 248/477
[58] Field of Search ................ 350/307, 288, 279–281; 248/475 B, 477, 478, 486, 479, 481–483

[56] References Cited

U.S. PATENT DOCUMENTS 3,495,896 2/1970 Barcus et al. ........................ 248/477

FOREIGN PATENT DOCUMENTS

| 3608 | 8/1979 | European Pat. Off. ............ 350/288 |
| 2549759 | 4/1977 | Fed. Rep. of Germany ... 248/475 B |
| 2744708 | 4/1979 | Fed. Rep. of Germany ...... 248/486 |
| 2838465 | 3/1980 | Fed. Rep. of Germany ...... 350/288 |
| 824217 | 11/1959 | United Kingdom ............ 248/475 B |

*Primary Examiner*—Jon W. Henry
*Attorney, Agent, or Firm*—Becker & Becker, Inc.

[57] ABSTRACT

An external rear view mirror for motor vehicles is provided and includes a mirror body arranged in a housing which is open on one side. The housing is connected with a mounting support for the housing by a rotating shaft in such a manner that the housing is pivotable about two essentially vertical axes located one behind the other as seen in the longitudinal direction of the vehicle. In addition, preferably in the region of the pivot axes, the housing is held by at least two releasable latches arranged at different distances from the mounting support.

5 Claims, 2 Drawing Figures

U.S. Patent

Apr. 19, 1983

4,380,370

OUTSIDE REAR VIEW MIRROR FOR MOTOR VEHICLES

The present invention relates to an external rear view mirror for motor vehicles, and comprises a mirror body arranged in a housing which is open on one side. The housing is connected with a mounting support for the housing by a rotating shaft in such a manner that the housing is pivotable about two essentially vertical axes located sequentially or one behind the other in the longitudinal direction of the vehicle. In addition, preferably in the region of the pivot axes, the housing is held by releasable arresting means.

The arresting means of such rear view mirrors are embodied in such a way that the arresting means are releasable during certain mechanical disturbances, for instance during accidents, allowing the rear view mirror or its housing with the mirror body to pivot either in the direction of travel or longitudinal direction of the vehicle, or in the opposite direction.

It is an object of the present invention to embody such a mirror in such a way that the mirror body will be adjustable into at least two different base positions, which is expedient, for instance, when using a mirror as a left or right mirror.

Figure 2:
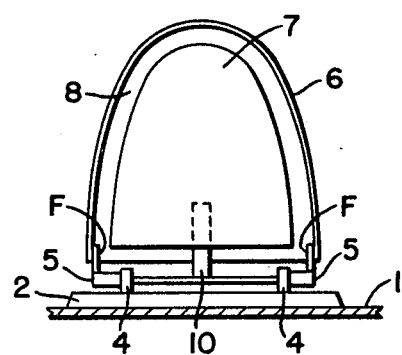

This object, and other objects and advantages of the present invention, will appear more clearly from the following specification in connection with the accompanying drawing, in which:

FIG. 1 is a plan view of one inventive embodiment of an external rear view mirror for motor vehicles; and FIG. 2 is a view taken in the direction of the arrow II in FIG. 1.

The mirror of the present invention is charaterized primarily by providing two or more arresting means which are arranged at different distances from the mounting support.

The presence of the pivot mounting and the arresting means is used to provide the mirror body two or more base positions or adjustments in order to be able to undertake a fine adjustment relative to the housing from these base positions again by pivoting the mirror body. Two or more grooves, slots, or notches are expediently provided along a path for realizing the features of the present invention. Pins, balls, or lock bolts can engage these notches and can in turn be spring-biased.

The different base positions can be brought about by overcoming these spring forces and pivoting the mirror housing. For example, with mirrors which are actually identical, the left mirror can be held in the first notch and the right mirror can be held in the second notch, in order then to be able to undertake the desired fine adjustment.

According to one specific embodiment of the present invention, the arresting means may be arranged in the region of a pivot or link for the rotating shaft, with which the arresting means are hinged with the mounting support.

The arresting means may permit the setting or adjustment of different angular positions of the housing relative to the mounting support thereof; these positions can be designated as different base positions.

The arresting means may include an extension or projection with a plurality of notches, and a pin or peg which releasably engages the notches.

Referring now to the drawing in detail, on a side wall 1 of a passenger vehicle, which wall extends in the traveling direction or longitudinal direction of the vehicle, there is fastened a holder or mounting support 2 for the external rear view mirror, which holder serves as a fastening base or foot. The holder 2 is rigidly connected with the side wall 1 by screws or other suitable fasteners. This holder 2 has two supports or bearings 3,4 located sequentially or one behind the other in the longitudinal direction of the vehicle. The bearing or support 3 is a hinge or link with a vertical or essentially vertically extending pivot axis for pivotal connection of a rotating shaft 14. The free end of the shaft 14, in turn, is, by way of a link 5 having a vertical or essentially vertically extending pivot axis, hinged with the housing 6 for the mirror body 7, illustrated by dash lines. More specifically, the connection between the link 5 and the housing 6 is effected by fastening or mounting brackets F.

The mirror body 7 is adjustable by means of the ball-and-socket joint (also illustrated by dash lines), and is arranged in a shell-shaped housing 6 which is open in the region 8 lying at the rear when viewed in the travel direction. The mirror body 7 is preferably arranged in such a manner that a pivoting is possible, for example by means of the ball-and-socket joint, about a vertical axis and a horizontal axis. The adjustment is preferably effected from the interior of the vehicle by way of knobs 9 and the like installed inside the vehicle. The mechanical transmission from the knobs or levers and the like to the mirror body 7 can be any suitable type.

The support 4 is a clamp which is capable of fixing or holding the link 5 with a predetermined force. At the opposite end of the rotating shaft 14 is located a projection or extension 10 provided with notches or grooves 11 and projecting into the housing 6. These notches 11 are spaced at different distances from the mounting support 2. A pin or peg 13 located on the inner side of the housing wall 12 can engage these notches 11, and in particular in such a manner that, for instance by the elastically yieldable mounting of the projection 10, the connection brought about by the positive engagement between the peg 13 and the projection 10 can be released with a force exerted in the direction of the arrow 15. Consequently, the housing 6 with the mirror body 7 can swing forwardly in the travel direction. In contrast, with a force exerted in the direction of the arrow 16, the clamping at the support 4 can be released in order to bring about a swinging movement in the direction of the arrow 16. The connection of the rotating shaft 14 with the mounting support 2 and the housing 6 corresponds accordingly in essence to the mounting of swinging or pendulum doors by means of a pendulum door band or belt, though with the exception that the swinging can occur only under the conditions mentioned above.

Two notches 11 are arranged on the projection 10, so that on the one hand the base portion of the housing 6 illustrated in the drawing is attainable, and furthermore a base position is attainable with which the peg 13 engages in a notch 11 located on the free end of the projection 10. Under these circumstances, the housing 6 with the mirror body 7 is in the position 17 illustrated by dash lines.

Although the arresting means 11, 13 are preferably to be arranged in that region of the rotating shaft 14 or of the housing 6 located in the vicinity of the support 3, the support 4 can analogously also be provided with two, or even three, arresting locations, in order accordingly to bring about base positions by swinging in the direction of the arrow 16.

The arresting means, with elastic yielding capability, can be suitably embodied in any way. However, ball, pin, or peg arresting means have been found to be especially suitable because it is simple to attain the elastic yielding capability of the connection by way of a suitable elastic mounting of the peg, pin, or ball.

The present invention is, of course, in no way restricted to the specific disclosure of the specification and drawing, but also encompasses any modifications within the scope of the appended claim.

What I claim is:

1. An external rear view mirror for motor vehicles, comprising:
    a mounting support connected to said vehicle;
    a housing open on one side;
    a mirror body arranged in said housing;
    a rotating shaft interposed between said mounting support and said housing, said housing being connected with said mounting support by said rotating shaft in such a way that said housing is pivotable about two essentially vertical axes arranged one behind the other when viewed in the longitudinal direction of said vehicle; and
    at least two arresting means for releasably holding said housing, said arresting means being respectively located at different distances from said mounting support.

2. A mirror according to claim 1, in which said arresting means are arranged in the region of at least one of said two essentially vertical pivot axes.

3. A mirror according to claim 2, which includes a support link mounted on said mounting support for holding said rotating shaft, said arresting means being arranged in the region of said support link and being hinged to said mounting support by means of said support link.

4. A mirror according to claim 1, in which said arresting means permit different angular positions of said housing relative to said mounting support.

5. A mirror according to claim 1, in which said arresting means includes a projection associated with said rotating shaft and provided with a plurality of notches, and a corresponding part associated with said housing for releasably engaging said notches.

* * * * *